June 15, 1954
W. C. SMITH
2,681,233
RACK FOR REMOVING GLASS CASE FRONTS
Filed Sept. 19, 1951
2 Sheets-Sheet 1
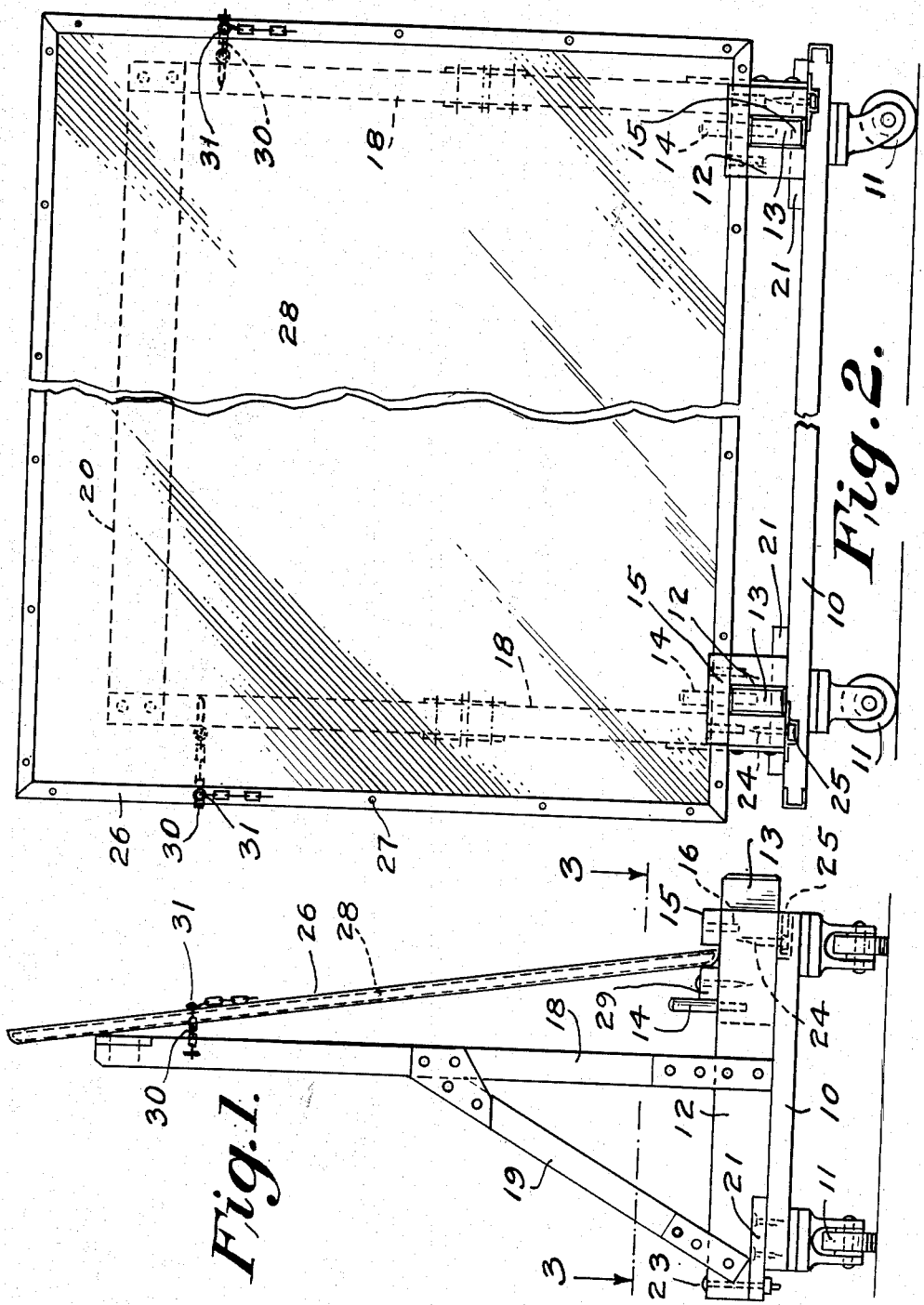
INVENTOR
WILLIAM C. SMITH
BY
H. L. Godfrey
ATTORNEY

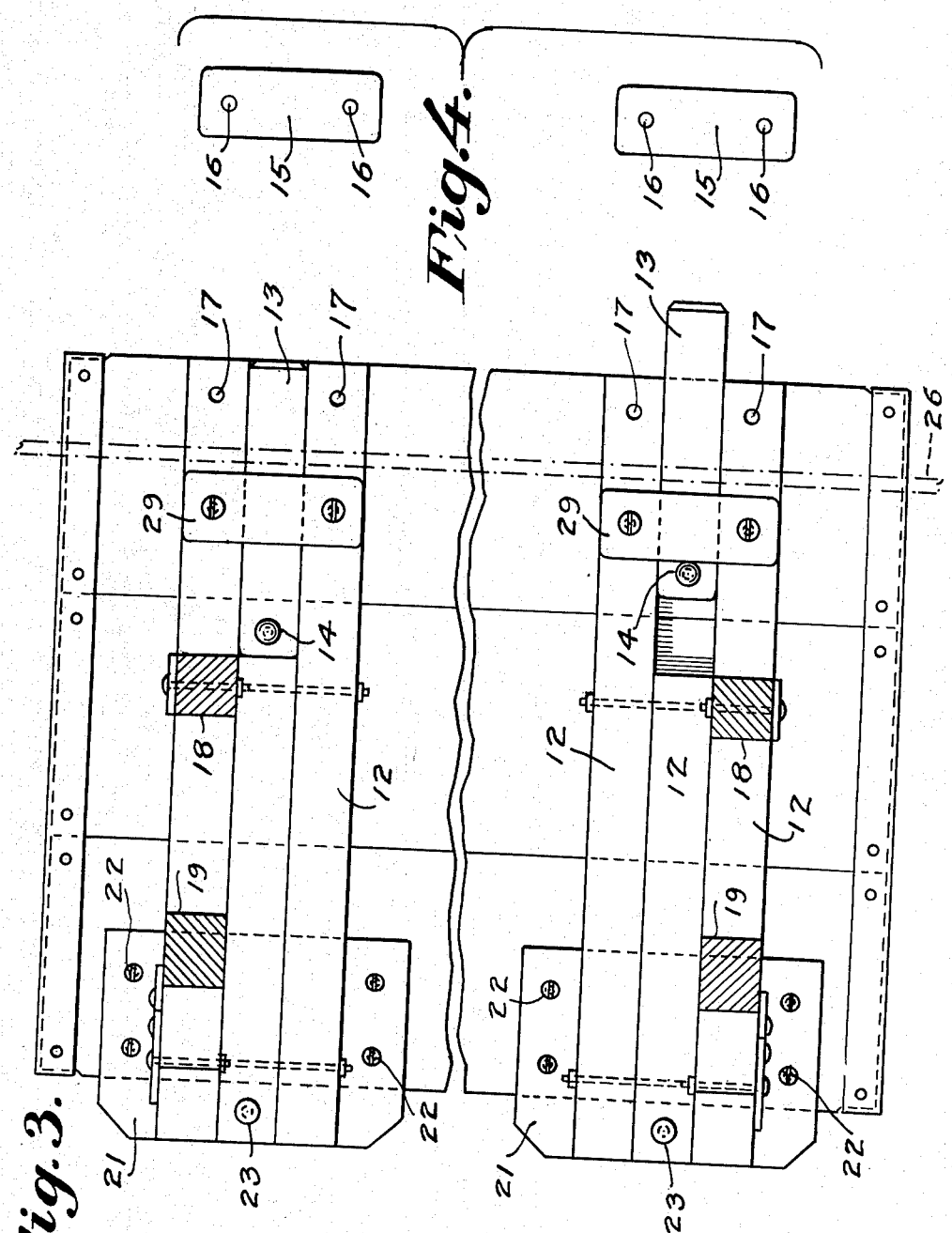

Patented June 15, 1954

2,681,233

UNITED STATES PATENT OFFICE 2,681,233

RACK FOR REMOVING GLASS CASE FRONTS

William C. Smith, Brentwood, Md.

Application September 19, 1951, Serial No. 247,352

1 Claim. (Cl. 280—79.3)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to an easel-type rack for temporarily supporting a plate glass front of a museum show case to permit the substitution of new exhibits and the cleaning of the inner face of the glass, by one man who is enabled to do with ease the job formerly done with greater difficulty by two men without the benefit of my rack.

In the accompanying drawings, which illustrate a preferred embodiment of my device:

Figure 1 is an end elevation.

Figure 2 is a side elevation, centrally broken away.

Figure 3 is a section on the line 3—3 of Figure 1.

Figure 4 is a detail plan view of two of my detachable load confining stops.

The device is designed for mounting on a platform-type truck 10 having four supporting castors 11 and is provided with two horizontally spaced load supports 12, each provided with a central extendible supporting bar 13 provided with a handle 14. A detachable transverse load confining stop 15 is mounted on and transversely of the supports 12 and provided with two spaced securing pins 16 which fit in holes 17 in the load supports 12.

Each load support 12 serves as a supporting base for a vertical post 18 and an inwardly inclined brace 19. The support 12 and post 18 form a rigid triangular easel element. A horizontal cross bar 20 joins the upper ends of the spaced posts 18 to complete my easel-type support, which is detachably secured to the platform truck 10. Each load support 12 is notched to receive a laterally extending cleat 21 which is fastened to the truck 10 by screws 22. My easel-type support is detachably secured to the truck 10 by a bolt 23 through the load support 12 and the cleat 21 and by downwardly protruding bolts 24, the protruding heads of which slidably fit in laterally open T-shaped slots 25. The easel is easily attached to the truck 10 by engaging the heads of the bolts 24 in the slots 25, sliding the easel until the bolt hole in the support 12 aligns with the corresponding hole in cleat 21, then locking easel and truck together with the bolt 23.

In operation, the easel and supporting platform truck are moved against a case from which a front formed of a detachable metal frame 26 having a plurality of threaded holes 27 in which there is mounted a sheet of plate glass 28. The truck wheels are braced against accidentally rolling away from the case, as by clamping each of two wheels in clamps of the type designed for use by cabinet makers for holding pieces of wood while waiting for glue to harden. The case front attaching bolts are removed from threaded holes 27, the glass is tilted outwardly to clear the upper edge of the case and one end is slightly raised to permit shoving the bar 13 underneath and the raised end is lowered until it rests upon the bar 13. The other end of the front is then lifted out of the case and lowered to rest on the companion support 12. The case front is then shifted to make contact with two fixed stops 29 mounted on said load supports 12. The front is then tilted outwardly until it is supported on my easel. It may then be secured in this position by a chain 30 having one end fastened to post 18 and detachably secured by a machine bolt 31 which screws into a hole 27. The clamps are then released and the truck is rolled outwardly to permit access to the case for changing the exhibits and cleaning the inner face of the plate glass.

The front is returned to its normal place in the case by reversing the procedure used in detaching and removing the front.

It should be understood that the present disclosure is for the purpose of illustration only, and that the invention includes all modifications and equivalents which fall within the scope of the appended claim.

What I claim is:

A rack adapted for mounting on a platform-type truck for handling plate glass fronts of museum show cases, which comprises two horizontal spaced load supports each consisting of two parallel spaced supporting members, a central extendible supporting bar provided with a handle operatively mounted between said supporting members, a load confining stop detachably mounted transversely on each of said load supports, two fixed stops each spaced from one of said detachable stops and a bracing element mounted rearwardly of said fixed stops on the side away from said detachable stops provided with an inclined brace on the far side of said stops.

References Cited in the file of this patent

UNITED STATES PATENTS

| Number | Name | Date |
|---|---|---|
| 1,213,032 | Smith | Jan. 16, 1917 |
| 1,836,362 | Crowley | Dec. 15, 1931 |
| 1,960,805 | Clark et al. | May 29, 1934 |
| 2,005,099 | McLeod | June 18, 1935 |
| 2,518,624 | Kraft | Aug. 15, 1950 |